United States Patent
Williams

(10) Patent No.: US 7,552,787 B1
(45) Date of Patent: Jun. 30, 2009

(54) ENERGY RECOVERABLE WHEEL MOTOR

(76) Inventor: Kevin R. Williams, P.O. Box 1359, Cypress, TX (US) 77421

( * ) Notice: Subject to any disclaimer, the term of this patent is extended or adjusted under 35 U.S.C. 154(b) by 284 days.

(21) Appl. No.: 11/539,574

(22) Filed: Oct. 6, 2006

Related U.S. Application Data

(60) Provisional application No. 60/724,232, filed on Oct. 7, 2005.

(51) Int. Cl.
 *B60K 1/00* (2006.01)
(52) U.S. Cl. .................. 180/65.51; 180/65.6; 310/254
(58) Field of Classification Search ............... 180/230, 180/253, 220, 65.5, 65.6, 68 R; 310/67 R, 310/67 A, 254, 68 R
See application file for complete search history.

(56) References Cited

U.S. PATENT DOCUMENTS

| | | | | |
|---|---|---|---|---|
| 1,452,698 A * | 4/1923 | Osborn | ........................ | 180/230 |
| 1,577,304 A * | 3/1926 | Schurch | .................... | 310/67 R |
| 4,394,594 A * | 7/1983 | Schmider et al. | .......... | 310/68 R |
| 5,087,229 A * | 2/1992 | Hewko et al. | .............. | 180/65.5 |
| 5,382,854 A * | 1/1995 | Kawamoto et al. | ........ | 310/67 R |
| 5,450,915 A * | 9/1995 | Li | .............................. | 180/65.5 |
| 5,767,595 A | 6/1998 | Rosen | | |
| 6,278,216 B1 * | 8/2001 | Li | ............................. | 310/67 A |
| 6,328,123 B1 * | 12/2001 | Niemann et al. | ........... | 180/65.5 |
| 6,605,884 B2 * | 8/2003 | Nishimoto | ................. | 310/67 A |
| 6,752,227 B1 * | 6/2004 | Bachmann | ................. | 180/65.5 |
| 6,819,012 B1 | 11/2004 | Gabrys | | |
| 6,942,049 B2 * | 9/2005 | Shimizu | ..................... | 180/65.6 |
| 7,214,155 B2 * | 5/2007 | Mueller et al. | ............. | 180/65.5 |
| 7,350,605 B2 * | 4/2008 | Mizutani et al. | ........... | 180/65.5 |
| 2007/0257570 A1 * | 11/2007 | Walter et al. | .............. | 310/67 R |

* cited by examiner

Primary Examiner—Hau V Phan
(74) Attorney, Agent, or Firm—Egbert Law Offices PLLC

(57) ABSTRACT

An energy recoverable wheel motor for attachment to an axle has a motor mount plate suitable for attachment to the axle, a rim defining an outwardly periphery of the wheel, a flywheel mounted interior of the rim and freely rotatable relative to the motor mount plate, a first rotor motor affixed to an interior surface of the flywheel so as to rotate with a rotation of the flywheel, and a second stator motor fixedly positioned relative to the first rotor motor. A second stator motor is affixed to the motor mount plate. A stator motor is fixedly positioned relative to the second stator motor. The first stator motor is affixed to one side of the vehicle mounting plate. The second rotor motor is affixed to an opposite side of the vehicle mounting plate.

6 Claims, 3 Drawing Sheets

ENERGY RECOVERABLE WHEEL MOTOR

CROSS-REFERENCE TO RELATED U.S. APPLICATIONS

The present application claims priority from U.S. Provisional Application Ser. No. 60/724,232, filed on Oct. 7, 2005, and entitled "Energy Recoverable Wheel Motor".

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to flywheel systems which receive kinetic energy for storage and for transmitting the kinetic energy for use. More particularly, the present invention relates to use of flywheel energy systems in combination with the wheel and braking system of an automobile.

2. Description of Related Art

Including Information Disclosed Under 37 CFR 1.97 and 37 CFR 1.98

As the price of fossil fuel rises and more and more people are utilizing personal vehicles as a means for transportation, the demand for fuel continues to increase. The population of the world is increasing, but just as importantly, the general population of many countries which historically did not have personal engine-driven vehicles is on the rise. There is more and more demand for hybrid electric vehicles, fuel cells, and electric means for transportation. These are designed for the most efficient means of converting energy to propulsion with the least amount of energy consumed.

In the conservation of energy, losses during the braking action of a motorized vehicle can be stored and reused during the acceleration of the vehicle. The efficiency of energy consumption for propulsion is increased and less energy is used because of capturing and reusing the energy that is normally burned as excess heat in the vehicle's braking system. There are many proven technologies which utilize this method of energy recovery. These technologies date back twenty or thirty years and are utilized in many hybrid electric vehicles.

U.S. Pat. No. 6,819,012, issued on Nov. 16, 2004 to C. W. Gabrys, describes a flywheel energy storage system which has an energy storage flywheel supported in a low pressure containment vessel for rotation on a bearing system. A brushless motor/generator is coupled to the flywheel for accelerating and decelerating the flywheel in order to store and retrieve energy. The flywheel is rotated in normal operation at a speed such that the generator voltage is higher than the output voltage. The flywheel's power supply efficiently maintains power to an electrical load during an interruption of primary power by supplying power generated from the flywheel's generator.

U.S. Pat. No. 5,767,595, issued on Jun. 16, 1998 to H. A. Rosen, provides a flywheel support system that isolates the flywheel and its motor-generator from the driving environment of an electrically-powered motor vehicle. During normal operation, a mechanical gimbal system keeps the vacuum housing centered in the outer housing, reacts the spin moments generated by the motor-generator, and provides a path for the electrical leads into the vacuum housing. A suitable liquid is placed between the outer and vacuum housings of the flywheel assembly to provide buoyancy and damping to the vacuum housing, cooling the motor-generator, and serving as one of the barriers to rotor energy and angular momentum transfer in the event of an accident or failure.

It is an object of the present invention to provide a flywheel system which allows for the transfer of kinetic energy in mechanical systems that have bi-directional power flows.

It is another object of the present invention to provide a flywheel energy system that is connected to the vehicle which stores energy during the braking phase of the vehicle and reuses the energy during the acceleration phase of the vehicle.

It is another object of the present invention to provide a flywheel energy system avoids the wasting of energy in the operation of a vehicle.

It is still a further object of the present invention to provide a flywheel system which serves to minimize fuel consumption and/or energy storage requirements by the vehicle.

It is another object of the present invention to provide a flywheel system that can be directly retrofitted to the wheels of an existing vehicle.

It is a further object of the present invention which allows the torque required for acceleration and braking to be split among the wheels of the vehicle.

It is a further object of the present invention to provide a flywheel system for the wheel of a vehicle which creates higher energy efficiency without the use of brushes or exciters.

It is still another object of the present invention to provide a flywheel system for energy transfer which minimizes battery requirements in the vehicle.

It is a further object of the present invention to provide a flywheel system applicable to the wheels of a motor vehicle which is applicable to gas, fuel cell, biomass, and all electric vehicles, including hybrids thereof.

It is another object of the present invention to provide an energy recoverable wheel motor which lengthens the life of mechanical brakes of the vehicle.

These and other objects and advantages of the present invention will become apparent from a reading of the attached specification and appended claims.

BRIEF SUMMARY OF THE INVENTION

An energy recoverable system which includes a vehicle body having an axle with a brake disk affixed to the axle, a wheel mounted to the axle such that wheel rotates with a rotation of the axle, a brake motor/generator set cooperative with the brake disk and positioned in proximity to the brake disk, a flywheel motor/generator set interconnected to the wheel and having a flywheel rotatable freely relative to the axle, and a control means interconnected between the brake motor/generator set and the flywheel motor/generator set. The controlling means serves for transferring energy from the brake motor/generator set to the flywheel motor/generator set during a braking of the vehicle body.

The flywheel motor/generator set is mounted an interior of the wheel. The flywheel has first rotor motor affixed thereto such that the rotor motor rotates with a rotation of the flywheel. The flywheel motor/generator set further includes a first stator motor affixed to the vehicle body such that the first stator motor is stationary relative to the first rotor motor. A second rotor motor is affixed to the vehicle body. A second stator motor is affixed to the axle. The second rotor motor is stationary relative to the second stator motor. A first bearing set is interposed between the first rotor motor and the first stator motor. A bearing set is interposed between the second rotor motor and the second stator motor. A motor mount plate is affixed to the axle. The second stator motor is affixed to a side of the motor mount plate opposite the axle. A pair of calipers are mounted on opposite sides of the brake disk. The brake motor/generator set and the flywheel motor/generator set can either be an induction motor generator or motor/generator with a permanent magnet structure.

The present invention is also a wheel motor for affixing to an axle of a vehicle. This wheel motor includes a mounting plate suitable for attachment to the axle, a rim defining an outer periphery of the wheel, a flywheel mounted interior of the rim and freely rotatable relative to the mounting plate, a first rotor motor affixed to an interior surface of the flywheel so as to rotate with a rotation of the flywheel, and a second stator motor fixedly position relative to the first rotor motor. A second stator motor is affixed to the mounting plate. A second rotor motor is fixedly position relative to the second stator motor. The first stator motor is affixed to one side of a vehicle body mount. The second rotor motor is affixed to an opposite side of the vehicle body mount. The second rotor motor is positioned interior of the first stator motor. The second stator motor is positioned interior of the second rotor motor. A first bearing set is interposed between the first rotor motor and the first stator motor. A second bearing set is interposed between the second rotor motor and the second stator motor. A controller is positioned interior of the rim. The controller serves to transferring energy to and from the flywheel relative to a rotation of the mounting plate.

In the present invention, the brake motor/generator set is cooperative with the brake disk such that during braking, the induction stator is excited with a traveling field that is slower than the brake disk. As a result, braking torque is applied to the brake disk. In this manner, the brake motor/generator set goes into a generator during the braking action.

The brake motor/generator set is transferred to the flywheel motor/generator set. This transfers power to the flywheel by exciting the field of the flywheel so as to speed up the flywheel. Since the stator is traveling opposite to the flywheel a braking of the wheel occurs. As a result, the braking torque is applied by both brake motor/generator set and by the flywheel motor/generator set. When this energy recoverable wheel motor is applied to all four wheels of a conventional automobile, the braking torque is split into two units per wheel or for a total of eight units. As such, the system of the present invention can be suitable sized in a minimal fashion so as to provide the requisite braking energy to the vehicle.

During acceleration, the flywheel motor/generator set is excited with a field traveling slower than the flywheel. This results in a braking of the flywheel and the application of acceleration torque to the wheel. The flywheel motor/generator set generates power to the induction stator associated with the brake motor/generator set. As such, the induction motor operates to accelerate the brake disk. Acceleration torque is also split into two units per wheel or a total of eight units in a four wheel vehicle.

DETAILED DESCRIPTION OF THE INVENTION

Figure 1:
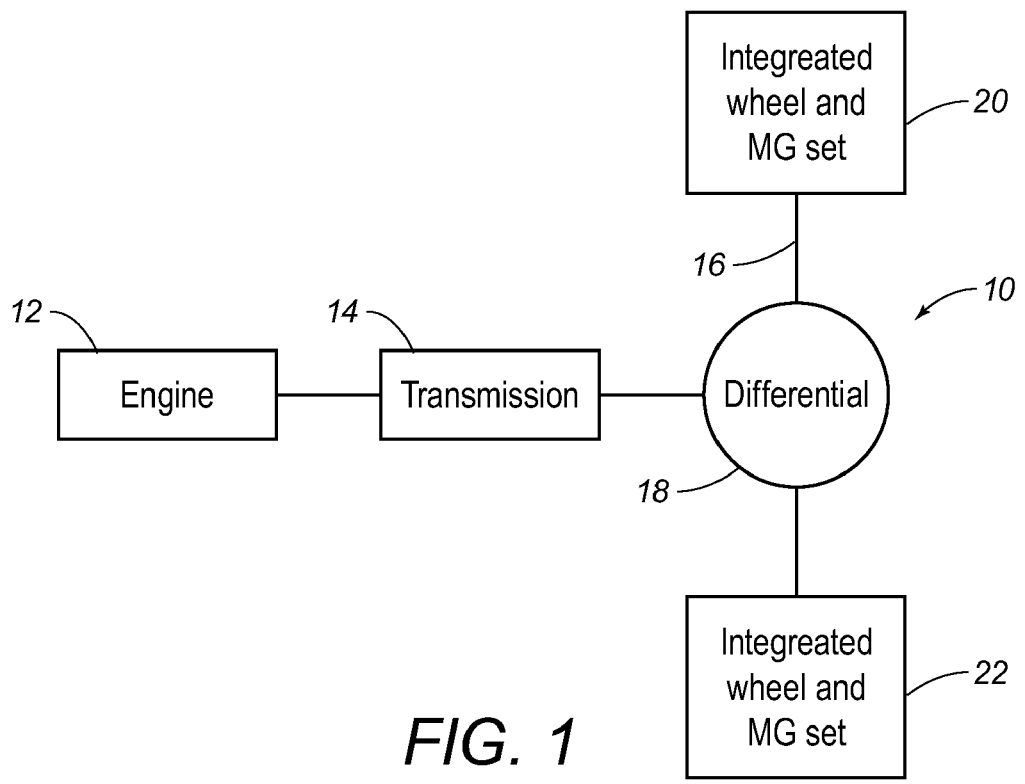
FIG. 1 is a schematic illustration of the application of the energy recoverable wheel motor of the present invention to the power system of a vehicle.

Referring to FIG. 1 there is shown the system 10 for the application of the energy recoverable wheel motor to a vehicle power system. The vehicle power system includes an engine 12 that is coupled to a transmission 14. An axle 16 extends from differential 18 to an integrated wheel and motor/generator set 20 at one side and to an integrated motor wheel and motor/generator set 22 at an opposite end of the axle 16. As can be seen, each of the integrated wheel and motor/generator sets 20 and 22 generally operate independently of the differential 18, the transmission 14 and the engine 12 of the vehicle. In this manner, it is relatively easy to see how the present invention can be retrofitted to existing vehicles without the need for modifying the drive train or power system of the vehicle.

Figure 2:
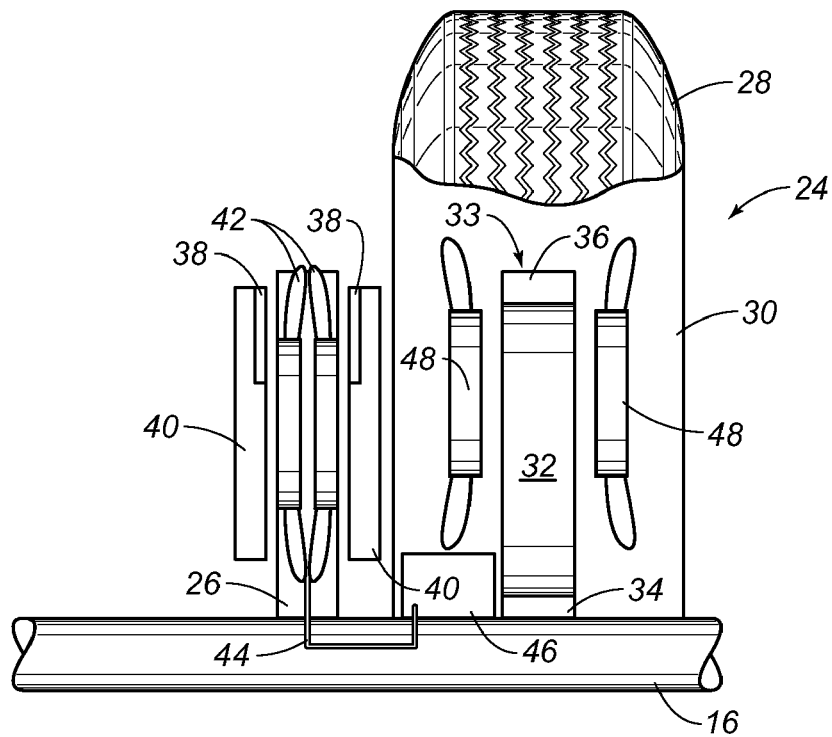
FIG. 2 is a diagrammatic illustration of the application of the energy recoverable wheel motor of the present invention to the wheel and brake disc of a vehicle.

FIG. 2 shows a single wheel motor 24 in accordance with the conceptual teachings of the present invention. As can be seen, axle 16 extends in a conventional fashion with a brake disk 26 mounted thereon. Tire 28 is suitably mounted over a wheel 30. Wheel 30 is also fixedly secured to the axle 16. Both the brake disc 26 and the wheel 30 rotate with the axle 16 in a conventional fashion.

The flywheel 32 is independently mounted relative to the axle 16 through use of a secondary bearing 34. As such, the flywheel 32 will rotate independently of the axle 16. A carbon composite banding 36 will extend around the periphery of the flywheel 32 so as to enhance the structural integrity of the flywheel 32 and also to provide containment and strength to the flywheel 32. Calipers 38 are arranged in proximity to the brake disk 26 so as to provide braking action when such braking action is desired by the vehicle driver. Stationary motor/generator units 40 are positioned on opposite sides of the brake disk 26. Induction stator 42 is mounted on the brake disk 26 so as to cooperate with the induction motor/generator 40. The stator 42 is connected by an electrical line 44 to an electronics package 46 mounted in the wheel 30.

In the present invention, the flywheel 32 is part of a second motor/generator 32. Stators 48 are mounted on opposite sides of flywheel motor/generator 33 within the wheel 30.

In the present invention, the induction motor/generators can be in the form of induction motors, but can be easily replaced with the a permanent magnet structure.

In use, the flywheel 32 will speed up during braking and will slow down during acceleration from a stop. The stator 42 of the induction motor/generator 40 is also fixed to the rotating reference frame and imparts torque to the induction motor/generator 40. The induction motor/generator 40 will be affixed to the frame of the vehicle.

During braking, the stator 42 associated with the motor/generator 40 is excited with a traveling field slower than the brake disk rotation speed. This induces a braking torque on the brake disk 26. The induction motor/generator 40 moves into a generator mode. As such, power from the motor/generator 40 is transferred to the flywheel motor/generator 33 by way of the electronics package 46. The field at the motor/generator 33 is excited to travel faster than the flywheel in order to speed up the flywheel 32. The reaction torque at the stators 48 is opposite to the braking on the wheel 30. Both the motor/generator 40 and the motor/generator 33 work together to produce the requisite braking power. This means that the braking torque per wheel is split between the two units.

The opposite happens during acceleration. The induction motor/generator 33 is excited with a field traveling slower than the flywheel 32. The flywheel will then witness a braking torque. The power from this braking torque is transferred, by reaction, as an accelerating torque to the wheel 30. The motor/generator 33 goes into a generator mode. As a result, the motor/generator 40 is excited with a field traveling faster than a rotation speed of the brake disk 26. This requires power since the motor/generator 33 is acting as an induction motor with the power being generated from the motor/generator 40. As such, both units act in tandem to produce the required torque for the vehicle during braking and acceleration.

It is important to note that the present invention utilizes two motor/generator sets on the same wheel. The secondary of one motor/generator set is anchored to the vehicle. The secondary of the other motor/generator set is anchored to the flywheel. The primary of both motor/generator sets is tied to the wheel. Several key advantages result from this approach. First, energy transfer between the motor/generator sets a common torque on the wheel from both units. Torque required for acceleration and braking is therefor split between eight units (among the four wheels of the vehicle). Secondly, because of the primary winding of both motor/generator sets reside together on the wheel reference frame, higher excitation voltages with resulting higher efficiency can be employed without the use of brushes or exciters. Thirdly, rapid energy transfer occurs independent of the vehicle's electrical system. As a result, the battery life will not be compromised by thermal and cyclic loadings. The battery is never required to supply or receive energy quickly. The system of the present invention can be applied equally to gas-powered, fuel cell-powered, biomass-powered, and electric-power vehicles, including hybrids thereof. The system of the present invention will serve to greatly lengthen the life of the mechanical brake since a great deal of the braking energy is supplied by the motor/generator, rather than the direct application of the brake pads to the brake disk.

Figure 3:
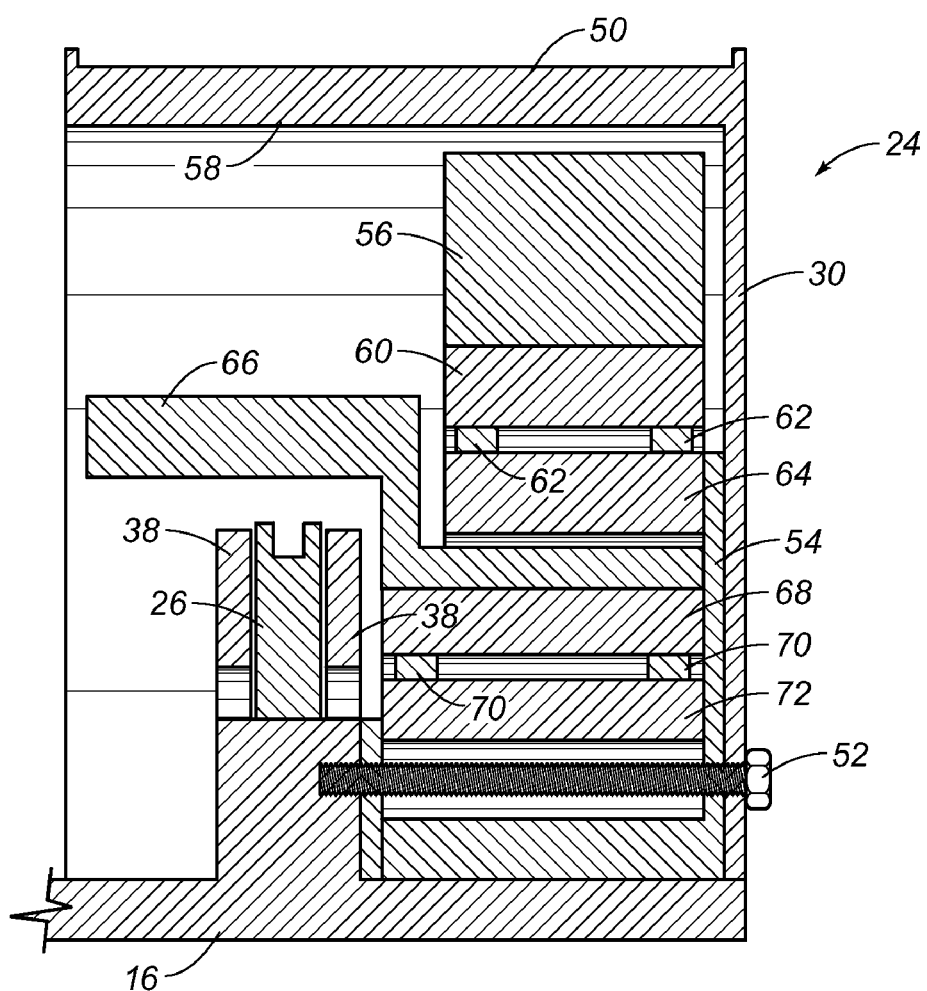
FIG. 3 is a quarter-sectional view of the energy recoverable wheel motor in accordance of the preferred embodiment of the present invention.

FIG. 3 shows a cross-sectional view of the wheel motor 24 of the present invention. Initially, it can be seen that the wheel 30 includes a rim 50 suitable for receiving the tire thereon. The wheel 30 is connected to the axle 16 by way of a lug bolt 52. A motor mount 54 extends in close relationship to the wheel 30 and is also affixed to the axle 16 through the use of lug bolt 52. A flywheel 56 is positioned in proximity to the inner wall 58 of the rim 50. A rotor motor 60 is affixed to the flywheel 56 so as to rotate with the rotation of the flywheel 56. High speed bearings 62 will allow for the rotational mounting of the rotor motor 60 and the flywheel 56 relative to the stator motor 64. As a result, the flywheel 56 and the rotor motor 60 are free to rotate independently of the rotation of the stator motor 64. The stator motor 64 is affixed to an outer periphery of the motor mount 54. The vehicle body 66 will extend into proximity to the motor mount 54. The stator motor 64 will rotate with the wheel 30 but rotates independently of the vehicle body 66. As such, the vehicle body 66 is spaced from the stator motor 64. A rotor motor 68 is mounted to a surface of the vehicle body 66 opposite to the location of the stator motor 64. Low speed bearings 70 are interposed between rotor motors 68 and stator motor 72. Stator motor 72 is also mounted to the motor mount 54. Since the vehicle body 66 will be in a fixed position relative to the rotation of the wheel 30, the rotor motor 68 will be in a fixed position relative to the rotation of the stator motor 72 with the rotation of the wheel 30. The brake disk 26 is illustrated as mounted onto axle 60 with calipers 38 positioned on opposite sides of the brake disk 26.

Figure 4:
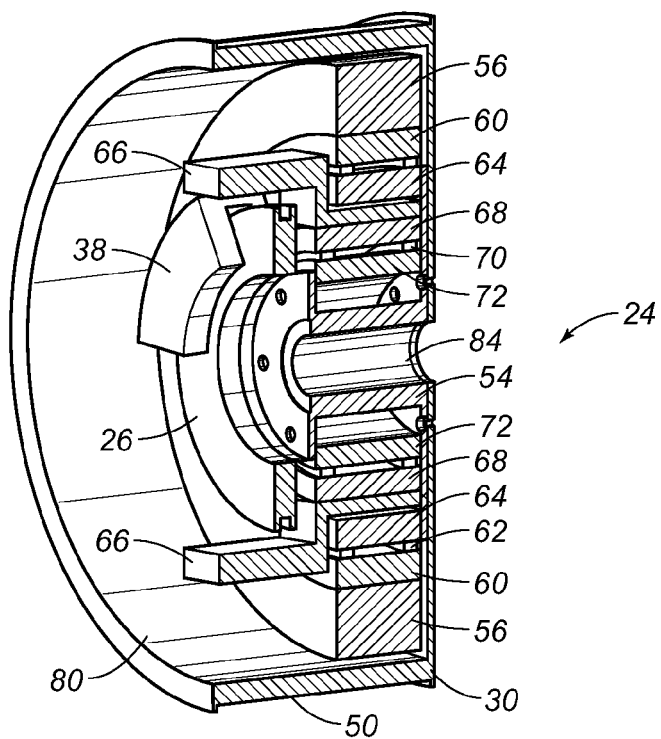
FIG. 4 is a perspective cut-away view from one side of the wheel motor of the present invention.
Figure 5:
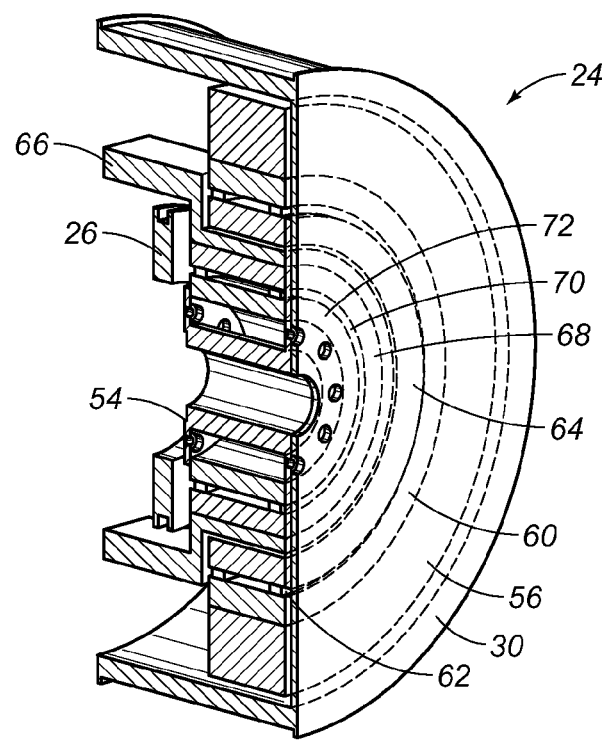
FIG. 5 is a perspective view of the opposite side of the energy recoverable wheel motor in accordance with the preferred embodiment of the present invention.

FIGS. 4 and 5 illustrate the wheel motor 24 from opposite perspective views. Initially, it can be seen that the wheel 30 has rim 50 extending therearound. Rim 50 is suitable for receiving a vehicle tire thereon. The flywheel 56 is illustrated as extending in close proximity to the inner surface 80 of the rim 50 of wheel 30. The rotor motor 60 is affixed to an inner wall of the flywheel 56 so as to rotate freely with the flywheel 56. Stator motor 64 is positioned in close proximity to and interior of the rotor motor 60. High speed bearings 62 facilitate the free rotation of the flywheel 56 and the rotor motor 60 relative to the stator motor 64.

The vehicle body mount 66 extends into the wheel 30. The vehicle body mount 60 allows the rotor motor 68 to be directly affixed thereto. Rotor motor 68 is placed in close proximity to the stator motor 72. Low speed bearings 70 allow the free rotation of the stator motor 72 with respect to the fixed rotor motor 68. The motor mount plate 54 extends centrally of the stator motor 72 and has an interior 84 suitable for being fixed upon the axle of the vehicle. As can be seen, the brake disk 26 is affixed to the motor mount 54 such that the brake disk 26 will rotate with the rotation of the axle that is received within the interior 84 of the motor mount 54. Calipers 38 extend on both sides of the brake disk 26.

FIG. 5 shows another view of the wheel motor 24 of the present invention. As can be seen, each of the components of the present invention having a generally annular configuration. Initially, the wheel 30 extends around the flywheel 56. The rotor motor 60 is affixed to an inner wall of the flywheel 56. High speed bearings 62 are interposed between the rotor motor 60 and the stator motor 64. The rotor motor 68 is arranged in proximity to stator motor 72 with low speed bearings 70 interposed therebetween. Motor mount 54 extends centrally of the wheel 30. The vehicle body mount 66 will extend into the wheel 30 so as to support the previously-described components thereon. Brake disk 26 is located on an inner side of the wheel 30, as illustrated in FIG. 5.

The foregoing disclosure and description of the invention is illustrative and explanatory thereof. Various changes in the details of the illustrated construction or in the described method can be made within the scope of the appended claims without departing from the true spirit of the invention. The present invention should only be limited by the following claims and their legal equivalents.

I claim:

1. An apparatus comprising:
   a vehicle body having an axle and a brake disk affixed to said axle such that said brake disk rotates with a rotation of said axle;
   a wheel mounted to said axle such that wheel rotates with a rotation of said axle;

a brake motor/generator set cooperative with said brake disk and positioned in proximity to said brake disk;

a flywheel motor/generator set interconnected to said wheel, said flywheel motor/generator set having a flywheel rotatable freely relative to said axle, said flywheel motor/generator set being mounted interior of said wheel, said flywheel having a first rotor motor affixed thereto such that said first rotor motor rotates with a rotation of said flywheel, said flywheel motor/generator set further comprising:

a first stator motor affixed to said vehicle body such that said first stator is stationary relative to said first rotor motor;

a second rotor motor affixed to said vehicle body;

a second stator motor affixed to said axle, said second rotor motor being stationary relative to said second stator motor; and a controlling means interconnected between said brake motor/generator set and said flywheel motor/generator set, said controlling means for transferring energy from said brake motor/generator set to said flywheel motor/generator set during a braking of said vehicle body.

2. The apparatus of claim 1, further comprising:
a first bearing set interposed between said first rotor motor and said first stator motor.

3. The apparatus of claim 1, further comprising:
a bearing set interposed between said second rotor motor and said second stator motor.

4. The apparatus of claim 1, further comprising:
a motor mount plate affixed to said axle, said second stator motor affixed to a side of said motor mount plate opposite said axle.

5. The apparatus of claim 1, said brake motor/generator set further comprising:
a pair of calipers mounted on opposite sides of said brake disk.

6. The apparatus of claim 1, each of said brake motor/generator set and said flywheel motor/generator set comprising an induction motor generator.

* * * * *